United States Patent [19]
Pechini

[11] 3,909,327

[45] Sept. 30, 1975

[54] METHOD FOR MAKING A MONOLITHIC CERAMIC CAPACITOR WITH SILVER BEARING ELECTRODES

[76] Inventor: Maggio P. Pechini, c/o Vincent H. Sweeney, Sprague Electric Company, North Adams, Mass. 01247

[22] Filed: Aug. 5, 1974
(Under Rule 47)

[21] Appl. No.: 494,690

[52] U.S. Cl. .................. 156/89; 29/25.42; 317/258; 427/79
[51] Int. Cl.² .......................................... B44D 1/18
[58] Field of Search ...... 156/89; 29/25.42; 117/217, 117/227, 62, 107.2 P; 317/258

[56] References Cited
UNITED STATES PATENTS

| | | | |
|---|---|---|---|
| 3,342,655 | 9/1967 | Crownover | 156/89 |
| 3,604,082 | 9/1971 | McBrayer et al. | 156/89 |
| 3,615,981 | 10/1971 | Pratt, Jr. et al. | 156/89 |
| 3,784,887 | 1/1974 | Sheard | 317/258 |

*Primary Examiner*—Cameron K. Weiffenbach
*Attorney, Agent, or Firm*—Connolly and Hutz

[57] ABSTRACT

In a method for making a monolithic ceramic capacitor, electroding paste is applied to plates of green ceramic. The paste contains palladium or silver or alloys or mixtures thereof and a substantial quantity of ceramic particles. The plates are stacked and the stack is immersed in a zirconia sand containing silver, and is fired at a temperature that sinters the ceramic material and melts the electroding metal. When the electroding metal is palladium, the surrounding silver vapor at firing diffuses into the metal forming a silver alloy therewith. The electroding metal may be silver or mixtures or alloys containing silver. In all cases the silver vapor atmosphere prevents substantial escape of silver from the electrodes.

7 Claims, 2 Drawing Figures

U.S. Patent Sept. 30,1975 3,909,327

3,909,327

METHOD FOR MAKING A MONOLITHIC CERAMIC CAPACITOR WITH SILVER BEARING ELECTRODES

BACKGROUND OF THE INVENTION

This invention relates to monolithic ceramic capacitors having silver containing electrodes.

Most monolithic ceramic capacitors today employ electrodes made of platinum group metals especially palladium. In recent years all metal costs have increased sharply and the need to use less expensive materials continues to intensify. At present palladium sells for about $105 per troy ounce and silver for about $4.85 per troy ounce. The substitution for even a small part of the commonly used palladium in capacitor electrodes with silver potentially results in significant cost savings and has the added advantage that the lower resistivity of silver tends to produce a capacitor with a lower dissipation factor. Silver, however is a highly volatile metal especially in the molten state having a very high vapor pressure. Considering the high firing temperatures required for sintering ceramic materials, (e.g., 1,800°F to 2,600°F) such use of silver has been seriously discouraged. The use of small quantities of ceramic powder in the electroding paste is known for the purpose of controlling the liquid flow of such fusible metals including silver and alloys thereof. It is also known to employ electrodes of silver or alloys thereof with small quantities of ceramic materials that are suitably fired at temperatures below the melting point of silver (1,760°F or 960°C). However, most dielectric ceramic materials require higher temperatures for proper curing and sintering, and silver being a highly volatile material tends to escape from the firing ceramic capacitor bodies rendering the electrode discontinuous and useless.

It is therefore an object of this invention to provide a monolithic ceramic capacitor with silver bearing electrodes capable of being fired at temperatures as high as 2,600°F.

It is another object to provide a monolithic ceramic capacitor with silver bearing electrodes capable of employing a broad variety of dielectric ceramic materials.

It is another object to provide a monolithic ceramic capacitor having a low cost.

SUMMARY OF THE INVENTION

A method for making a monolithic ceramic capacitor having silver bearing electrodes includes depositing a film of electroding paste on each of several plates of green ceramic material. The ceramic material may include barium titanate and bismuth stannate. The electroding paste contains particles that are by weight 50–80% metal and 50–20% ceramic which may or may not be the same ceramic material contained in the plates. The electroding paste metal may be palladium, silver, or a mixture including an alloy thereof. The plates are stacked upon each other and the stack is subsequently fired in an atmosphere containing silver vapor at a temperature suitable for sintering the ceramic and for melting the electroding metal. When the metal is palladium the silver vapor diffuses into the palladium forming silver palladium alloy electrodes that become molten. A suitable procedure for providing the silver vapor at firing is to immerse the stack in a silver loaded sand, such that the precious silver vapor is substantially confined to the immediate vicinity of the stack. The sand is preferably zirconia having about 3% by weight of silver.

The inclusion in the electroding paste of large quantities of ceramic particles prevents the molten electroding metal from balling up, seeping out and otherwise substantially flowing. Thus continuity of the electrodes is preserved. The use of a silver bearing environment during firing prevents the escape of silver metal or silver alloys that comprise the electrodes. Monolithic capacitors are thus provided having silver containing electrodes that are highly conductive and less costly than such capacitors that employ electrodes entirely of the platinum group metals.

DESCRIPTION OF THE PREFERRED EMBODIMENT

In practicing this invention there are many suitable methods for forming plates or tapes of green ceramic material, applying an electroding paste and stacking the plates prior to firing the stack. For example in U.S. Pat. No. 3,231,328 issued Jan. 25, 1966, Pechini describes the preparation of citrate grade barium titanates, and in U.S. Pat. No. 3,638,084 issued Jan. 25, 1972, Burn describes steps for applying a Pd-Ag electroding mixture to plates of green ceramic, that are subsequently stacked for firing.

Figure 1:
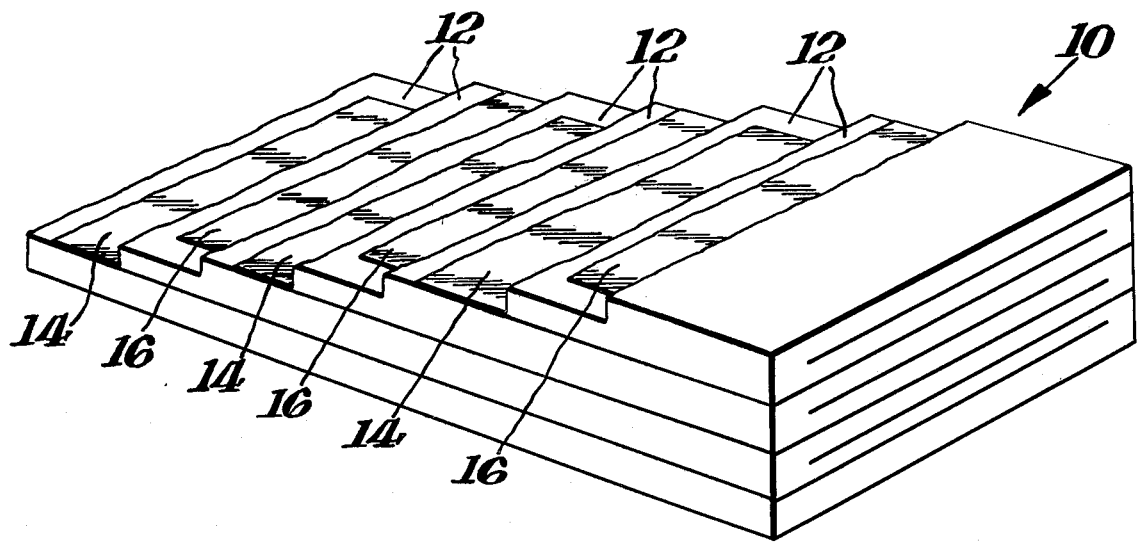
FIG. 1 shows in perspective view a capacitor stack of this invention, a portion of which is broken away to reveal electrodes buried therein.

In a first preferred embodiment of the method of this invention, an electroding paste consists in a mixture of palladium particles and particles of barium titanate in an organic binder, with equal amounts by weight of barium titanate and palladium. The electroding paste is screen printed onto a surface of each of several green unfired ceramic plates. Volatile parts of the binder are driven off and the film of paste is dried by heating for an hour at 150°C. The several plates are stacked upon each other as shown in FIG. 1 wherein the structure 10 of stacked plates 12 is broken away to reveal the alternately positioned electroded films 14 and 16. The electrode films are about 15 microns thick while the ceramic plates are 25 microns thick. The ceramic plates are made of about 97% barium titanate and 3% bismuth stannate.

Figure 2:
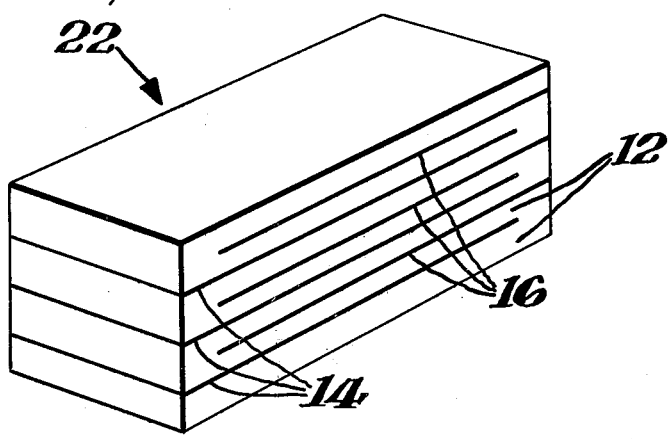
FIG. 2 shows a capacitor section of this invention having been cut from the stack of FIG. 1.

The green unfired stack is diced into individual sections as shown in FIG. 2. The individual capacitor sections are fired as described above. The opposite end faces at which alternate of the electrodes are exposed are cleaned. Metal terminals are applied to the opposite ends, each contacting the exposed electrodes. Capacitors that were made according to this method have dissipation factors of about 3%.

At firing, the stack of plates is placed in an air atmosphere furnace, immersed in a sand made of 97% zirconia and about 3% silver particles by weight, and held for two hours at 2,200°F. The melting point of palladium is 2,820°F. However, the silver diffuses into the palladium and when the silver content of the resulting alloy exceeds 64%, the alloy flows so as to fill the interstices of the powdered barium titanate forming a continuous sponge-like conductive network. The barium titanate particles at the same time prevent the liquid palladium-silver alloy from simply running out of the stack or forming balls of metal and creating discontinuities in the electrode. During firing, the barium titanate paticles coalesce with the ceramic plates and together form a unitary structure. Thus, during firing the silver rich sand creates a silver vapor environment for the stacked structure and by vapor diffusion of silver into the palladium, a fusible silver-palladium alloy is formed and upon cooling and solidifying provides a highly conductive electrode. More generally the method of this invention may be carried out by firing at temperatures from 1,800°C to 2,600°C. Of course, the silver content of the alloy that must be reached for melting varies with the particular firing temperature employed while each particular dielectric ceramic formulation that may be utilized has an associated optimum firing temperature. Finally, it is essential that at the firing temperature chosen, the electroding metal is melted.

Several experiments were performed wherein certain steps in the above described method were varied or eliminated. For example, when firing in an air atmosphere without silver vapor, metallic beads formed at the body faces at which the electrodes were to be exposed and the internal electrodes were nonconductive. It is known that bismuth containing ceramic materials are detrimental to and incompatible with palladium electrodes although the reasons are not well understood. Thus the good results obtained from the method of the first preferred embodiment with bismuth containing ceramic materials was surprising.

In another experiment the barium titanate particles were omitted from the electrode paste. The result was again discontinuous internal electrodes, significant amounts of palladium having run out of the stack. However, by adding as little as 20% and up to 50% by weight of barium titanate to the paste, good capacitors could be made. Using lower quantities is not considered practical since the molten metal then tends to flow too readily. More than 60% barium titanate in the paste will probably provide continuous electrodes although this has not been tried.

Other variations in the method of the first embodiment whereby a continuous palladium silver electrode is formed, are capable of providing useful low cost capacitors. For example, the paste may additionally contain silver particles and/or silver oxide particles. In this case the barium titanate particles in the paste will prevent discontinuities and the silver vapor atmosphere prevents the silver metal in the paste from escaping as a vapor during firing.

It has thus been found that, even though silver has a low melting point and in fact is highly volatile at the firing temperatures that are required for sintering many dielectric ceramics, the combination of silver and palladium in electrode pastes, provides continuous electrodes when the electrode paste contains large quantities of ceramic particles and a silver vapor rich atmosphere is present during firing.

In a second preferred embodiment, an electroding paste consists of an organic binder and 40% by weight of barium titanate and 60% by weight of silver. The electroding powder is prepared by wet milling silver oxide with citrate grade barium titanate, and heating the powder to 300°C for half an hour to reduce the silver oxide. The paste is screened onto green ceramic plates, the plates dried and stacked, and the stack is fired in silver bearing zirconia sand at 2,400°F for 2 hours. The separation between internal electrodes, namely the dielectric plate thickness was 50 microns and the electrode thickness was 10 microns. The capacitors so made had a dissipation factor of about 1%.

The manufacture of monolithic capacitors having silver bearing electrodes is made practical when produced according to the method of this invention. It should be understood that many variations in the details of the preferred embodiments are included within the scope of this invention and a wide range of ceramic materials may be used including those simultaneously or separately containing bismuth in the ceramic and palladium in the electrode system.

What is claimed is:

1. A method for making a monolithic ceramic capacitor having silver bearing electrodes comprising:
   a. depositing on plates of a green ceramic material a film of conductive electroding paste, said paste comprising particles that are by weight 50–80% metal and 50–20% ceramic material, said metal being selected from the group consisting of palladium, silver, and alloys and mixtures thereof;
   b. stacking said plates; and
   c. firing said stack in an atmosphere containing silver vapor at a sufficiently high temperature to sinter said ceramic materials and to melt said electroding metal.

2. The method of claim 1 wherein said electroding metal is palladium, said silver vapor diffusing into said palladium during said firing and forming a molten silver palladium alloy.

3. The method of claim 2 wherein said green ceramic material comprises barium titanate and bismuth stannate.

4. The method of claim 1 wherein said firing is accomplished at a temperature from 1,800°C to 2,600°C.

5. The method of claim 1 wherein said silver vapor bearing environment at firing is produced by covering said stack with sand containing silver particles.

6. The method of claim 5 wherein said sand is zirconia.

7. The method of claim 5 wherein said silver loaded sand is comprised of about 3% silver and 97% zirconia.

* * * * *